US008443670B2

(12) United States Patent
Hsu et al.

(10) Patent No.: US 8,443,670 B2
(45) Date of Patent: May 21, 2013

(54) 3-AXIS ACCELEROMETER WITH GAP-CLOSING CAPACITIVE ELECTRODES

(75) Inventors: Chia-Pao Hsu, Hsinchu (TW); Weileun Fang, Hsinchu (TW); Ming-Ching Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 787 days.

(21) Appl. No.: 12/556,433

(22) Filed: Sep. 9, 2009

(65) Prior Publication Data

US 2010/0212425 A1 Aug. 26, 2010

(30) Foreign Application Priority Data

Feb. 25, 2009 (TW) .............................. 98106060 A

(51) Int. Cl.
*G01P 15/125* (2006.01)
(52) U.S. Cl.
USPC ...................................................... 73/514.32
(58) Field of Classification Search
USPC ........................................ 73/514.32, 514.38
See application file for complete search history.

(56) References Cited

U.S. PATENT DOCUMENTS

| 4,882,933 | A  | * | 11/1989 | Petersen et al. ............ 73/514.38 |
| 5,877,421 | A  | * | 3/1999  | Biebl et al. ................. 73/514.17 |
| 6,772,632 | B2 | * | 8/2004  | Okada ........................ 73/514.32 |
| 7,578,189 | B1 | * | 8/2009  | Mehregany ................ 73/514.18 |
| 2005/0241364 | A1 | * | 11/2005 | Fujiyoshi et al. ............. 73/1.79 |

* cited by examiner

*Primary Examiner* — John Chapman, Jr.

(57) ABSTRACT

Disclosed is a novel three-axis capacitive-type accelerometer implemented on SOI wafer. The accelerometer consists of four springs, one proof mass, four pairs of gap-closing sensing electrodes (each pair of gap-closing sensing electrode containing one movable electrode and one stationary electrode), and several metal-vias as the electrical interconnections. The movable electrodes are on the proof mass, whereas the stationary electrodes are fixed to the substrate. The three-axis accelerometer has five merits. (1) The sensitivity of the accelerometer is improved since the proof-mass is increased by containing both device and handling silicon layers; (2) The sensitivity is also improved by the gap-closing differential capacitive sensing electrodes design; (3) The parasitic capacitance at bond pad is reduced by the existing of metal-vias between the device Si layer and handling Si layer; (4) The sensing gap thickness is precisely defined by the buried oxide of SOI wafer; (5) The stationary sensing electrodes anchored to the substrate also act as the limit stops to protect the accelerometer.

14 Claims, 4 Drawing Sheets

3-AXIS ACCELEROMETER WITH GAP-CLOSING CAPACITIVE ELECTRODES

FIELD OF THE INVENTION

The present invention relates to micro-electromechanical system accelerometer, and more particularly to a three-axis capacitive accelerometer.

BACKGROUND OF THE INVENTION

MEMS (Micro-electro-mechanical systems) accelerometer has been widely used in the automobile application, such as electronic stability control (ESC), adaptive cruise control (ACC), airbag systems and collision detection. The MEMS accelerometer even finds more applications in consumer electronics, for instance, the cell phone, PDA, digital still camera (DSC), and video games. Thus, the requirement of multi-axes accelerometer is rapidly increasing.

Presently, a capacitive-based type sensing approach has been widely applied as an inertial sensor. There are several advantages for the capacitive-based type sensing approach. Capacitive-based techniques are inherently less noise than piezoresistance techniques because of the lack of thermal noises. In the differential capacitive sensing approaches, because the output signal is a function of the capacitance difference existing between stationary electrode and movable electrode, any temperature effect acts the same to both capacitors and is therefore cancelled out therebetween, so that the signal stability is further improved. In the past, there are various in-plane accelerometers utilizing surface micromachining, bulk micromachining and CMOS-MEMS technologies. The out-of-plane CMOS-MEMS accelerometers use electric routing technique as parallel vertical combs for capacitive sensing. However, the sensitivity is quite restrictive because of the area variation sensing scheme.

Recently, CMOS-MEMS out-of-plane accelerometer with fully differential gap-closing capacitance sensing electrodes is presented. A post-CMOS wet etching process is established to realize the accelerometer with sensing electrodes of the sub-micron gap in the out-of-plane direction. However, one of the main challenges for multi-axes accelerometer is how to detect the acceleration in the Z-axis (out-of-plane axis).

In early periods, the capacitive sensing is employed using overlap area variation between movable and stationary vertical comb electrodes, and Z-axis capacitive sensing with a torsional suspension has been demonstrated using the technologies of DWP (Dissolved Wafer Processing). Also a monolithic three-axis micro-G resolution silicon capacitive accelerometer system implemented by using the combination of surface and bulk fabrication processes is demonstrated. However, the fabrication process is complicated with high cost.

A three-axis capacitive accelerometer has been developed using SOI (silicon on insulator) wafer. However, the electrode design in Z-axis is not the differential sensing architecture. The above-mentioned researches suffer from either non-differential sensing or complicated fabrication processes in the Z-axis sensing. Recently, the Z-axis differential SOI accelerometer is developed in different type of Z-axis novel vertical comb electrodes. The novel vertical electrodes are fabricated using two masks and a time-controlled RIE (Reactive Ion Etch) process, and then provide electrodes in different movable and stationary heights. According to this design, Z-axis acceleration is differentially detected easily using a set of the novel vertical electrodes. Furthermore, differential capacitive three-axis SOI accelerometer has been demonstrated using the novel vertical combs. However, Z-axis accelerometer with the gap closing differential electrodes using SOI wafer has still not yet been reported.

Accordingly, in order to fill the gap of the above-mentioned deficiencies in the state of the art, the applicant provides a gap-closing differential capacitive sensing three-axis accelerometer on SOI wafer to solve the above deficiencies in the prior art and reduce the cost thereof.

In order to eliminate the drawbacks of the conventional techniques, the new concepts and the solutions are proposed in the present invention so as to solve the above-mentioned problems. The present invention is described below.

SUMMARY OF THE INVENTION

The main purpose of the present invention provides a gap closing differential capacitive sensing accelerometers on SOI wafer. The buried oxide layer thickness of SOI wafer is used for sensing gap, so the sensing gap could be precisely defined. The proof mass is consisted of a device layer and a handling layer, and it could act as either upper electrode or lower electrode. In addition, the present design of the sensing electrode arrays realizes the implementation of differential sensing circuit. The metal via like CMOS process is used to connect the device layer and handling layer to achieve differential sensing concept. The limit stop mechanism in this design is also considered, so the device could be protected in unexpected shock.

In accordance with one aspect of the present invention, A sensing accelerometer includes: a substrate; and a movable unit further including: a movable element; and plural components connected to the substrate and the movable element.

Preferably, the substrate has plural inner edges each of which has an opposite one of the plural inner edges.

Preferably, the movable element has plural edges, the plural components are the plural flexible components, and the substrate is a fixing substrate and comprises: plural fixed anchors respectively connected to the plural flexible components; and plural fixed electrode plates disposed respectively beside the plural edges of the movable element.

Preferably, each of the plural fixed anchors has a corner, and the plural flexible components connect the respective corners of the plural fixed anchors.

Preferably, each of the plural fixed anchors, each of the plural fixed electrode plates and the movable element have a via disposed therein.

Preferably, the substrate and the movable unit are made of a Silicon on Insulator (SOI) wafer, and the respective vias conduct the substrate and the movable unit.

Preferably, the respective vias are filled by one selected from a group consisting of a silver paste, a polycrystalline silicon deposition and a metal sputtering.

Preferably, the movable unit and each of the fixed electrode plates have a gap therebetween, and the fixed electrode plates are differential type capacitive sensing electrodes.

Preferably, the plural fixed electrode plates includes: plural lower electrode plates respectively placed along a first group of the plural edges of the moveable element, and providing a lower limit of the movable unit in a Z-axis movement, wherein every two ones of the first group of the plural edges are opposite to each other, and the ones of the first group of the plural edges have an even total number; and plural upper electrode plates respectively placed along a second group of the plural edges of the moveable element, and providing an upper limit in the Z-axis movement for the movable unit, wherein every two ones of the second group of the plural edges are opposite to each other, and the ones of the second group of the plural edges have an even total number, wherein each of the plural fixed electrode plates has a portion being held over the movable element.

Preferably, the movable unit is movable in X-axis and Y-axis.

Preferably, each of the plural components is a spring.

Preferably, the sensing accelerometer is a capacitive sensing accelerometer with a gap-closing differential electrode.

In accordance with another aspect of the present invention, A multi-axes accelerometer includes: plural fixing element; and a movable element having plural components respectively connected to the plural fixing element; wherein the multi-axes accelerometer is a capacitive sensing accelerometer with a gap-closing differential electrode.

Preferably, the sensing accelerometer further comprises plural stationary electrode plates configured by the movable element, wherein the plural fixing elements are plural fixing anchors.

Preferably, the movable element has plural edges having a first and a second groups, and the plural stationary electrode plates are classified as: plural lower electrode plates respectively placed along the first group of the plural edges of the moveable element, and providing a lower restriction of the movable unit in a Z-axis movement; and plural upper electrode plates respectively placed along the first group of the plural edges of the moveable element, and providing an upper limit of the restriction movable unit in the Z-axis movement, wherein each of the plural stationary electrode plates has a portion being held over the movable element.

Preferably, each of the plural fixing anchors, each of the plural stationary electrode plates and the movable element are made of a Silicon On Insulator (SOI) wafer and have a via configured therein, and the respective vias conduct the plural fixing anchors, the plural stationary electrode plates and the movable element.

In accordance with a further aspect of the present invention, a multi-axes accelerometer includes: a movable element; plural stationary electrode plates respectively configured to provide a moving limit of a Z-axis movement of the movable unit.

Preferably, the movable element has plural edges having a first and a second groups, the plural stationary electrode plates are classified into plural lower stationary electrode plates and plural upper stationary electrode plates, the plural lower stationary electrode plates are respectively configured along the first group of the plural edges and provide a lower limit of the moving limit, the plural upper stationary electrode plates are respectively configured along the second group of the plural edges and provide an upper limit of the moving limit, the movable element and each of plural stationary electrode plates have a gap therebetween, and each of the plural stationary electrode plates has a portion being held over the movable element.

Preferably, the sensing accelerometer further comprises a fixing substrate having plural anchors and the plural stationary electrode plates, wherein the movable element has plural flexible components respectively connected to the plural anchors.

Preferably, the plural stationary electrode plates are differential type capacitive sensing electrodes.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 4(a)~(f) are the profile diagrams showing the present fabrication process on a typical SOI wafer respectively, wherein FIG. 4(a) shows the profile diagram of the oxide pattern, nitride deposition and pattern; FIG. 4(b) shows the profile diagram of the anisotropic Si etching and oxide deposition; FIG. 4(c) shows the profile diagram of the oxide and PR pattern on the handling layer; FIG. 4(d) shows the profile diagram of the DRIE etching; FIG. 4(e) shows the profile diagram of removing oxide layer and DRIE etching; FIG. 4(f) shows the profile diagram of the HF release and Silver paste dispense.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
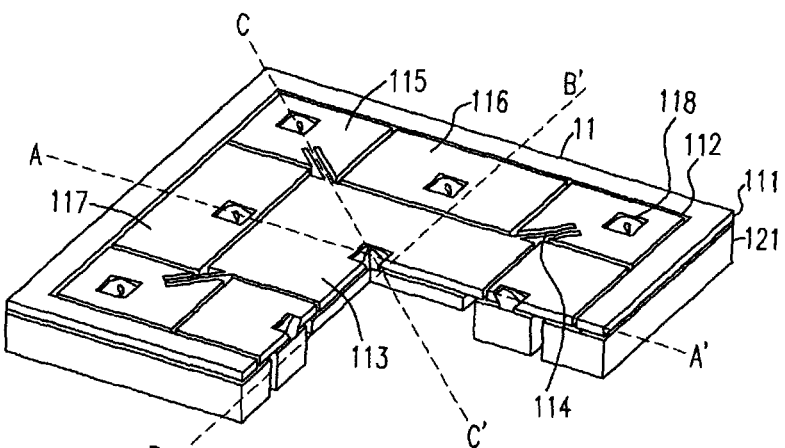
FIG. 1(a) is a front-side view showing a typical accelerometer of the present invention formed by the device silicon layer of SOI wafer.

Please refer to FIG. 1(a), which is a front-side view showing a typical accelerometer of the present invention formed by the device silicon layer of SOI wafer. As indicated in FIG. 1(a), the device silicon layer 111 is partitioned into five regions electrically isolated to each other by trenches 112. For instance, the central proof-mass 113 together with the four springs 114 and their anchors 115 are connected and could be regarded as one electrical isolated region. The two rectangular areas 116 along the cross-section BB' containing two upper stationary electrodes and their bonding pads are regarded as another two electrically isolated regions. Finally, the last two electrical isolated regions are the two rectangular areas 117 along the cross-section AA' which act as the bonding pads for the lower stationary electrodes. The metal-vias 118 are employed as the electrical interconnection to transfer the signal from the device silicon layer 111 to the handling silicon layer 121.

Figure 1B:
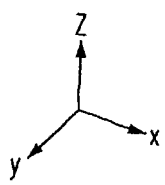
FIG. 1(b) is a rear-side view showing a typical accelerometer of the present invention formed by the handling silicon layer of SOI wafer.

Please refer to FIG. 1(b), which is a rear-side view showing a typical accelerometer of the present invention formed by the handling silicon layer of SOI wafer. As indicated in FIG. 1(b), there are four mesas (122,123) formed by the handling silicon layer 121. Two of these mesas 122 act as the supporting structures for the upper stationary electrodes, and the rest two mesas 123 are used as the lower stationary electrodes. The movable electrode plate 124 is limited and stopped by the four above-mentioned four mesas (122,123).

Figure 1B:
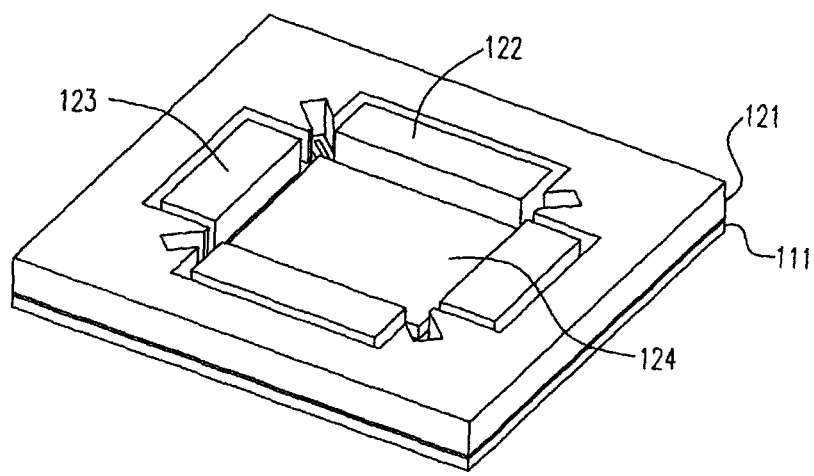
Figure 2A:
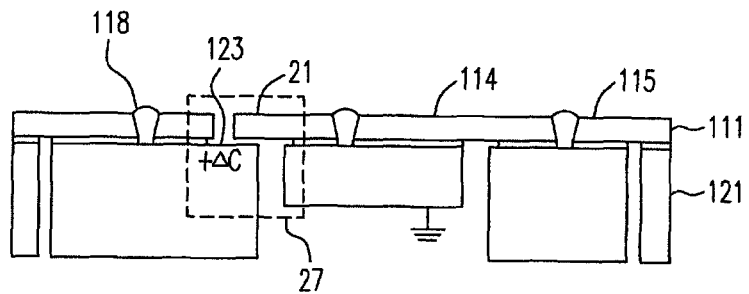
FIG. 2(a) is an AC' cross sectional view indicated in FIG. 1.
Figure 2B:
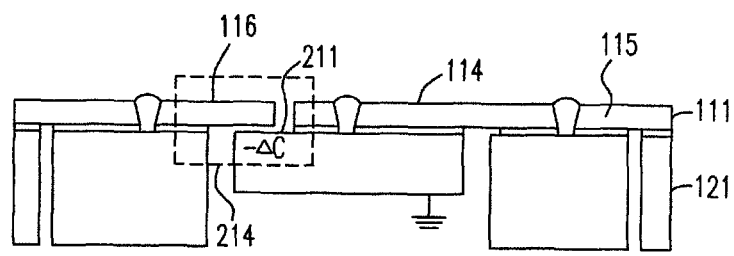
FIG. 2(b) is a BC' cross sectional view indicated in FIG. 1.

Please refer to FIG. 2 (a), which is a sectional view for the cross-section AC' indicated in FIG. 1. As depicted in FIG. 2(a), the pair of sensing electrodes shown in AC' cross section contains the movable upper electrode plate 21 on proof-mass (formed by the device silicon layer 111) and the stationary lower electrode plate 123 (formed by the handling silicon layer 121), which form a capacitive gap 27. The stationary lower electrode plate 123 is placed beside one of the opposite edges of the movable upper electrode plate 21, so as to be a lower restriction of the movable upper electrode plate 21 in a Z-axis movement. The metal vias 118 connect the device silicon layer 111 and the handling silicon layer 121.

Please refer to FIG. 2 (*b*), which is a sectional view for the cross-section BC' indicated in FIG. 1. As indicated in FIG. 2 (*b*), the pair of sensing electrodes shown in BC' cross section contains a movable lower electrode plate 211 (still on proofmass but formed by the handling silicon layer 121), and a stationary upper electrode plate 116 (formed by the device silicon layer 111), which form a capacitive gap 214. The movable lower electrode plate 211 connects the fixed anchor 115 with the spring 114.

As the proof mass is subjected to an acceleration G in the downward direction, the movable electrodes for both AC' and BC' cross sections will have a downward displacement. Thus, the sensing electrodes indicated in the AC' cross section will experience a decrease of sensing gap, and result in a capacitance change of +C. Meanwhile, the sensing electrodes indicated in the BC' cross section will experience an increase of sensing gap, and lead to a capacitance change of −C. As a result, such design forms a differential type capacitive sensing electrodes to improve sensitivity and signal-to-noise ratio. Since the metal-vias are employed as the electrical interconnection between the device silicon layer and handling silicon layer, the parasitic capacitance between these two layers is reduced.

Moreover, because of the electrode design, the displacement of the proof mass is constrained between the stationary electrodes of AC' and BC' cross sections. In other words, the stationary electrodes also act as the top and bottom limit-stop structures to protect accelerometer while under a large acceleration.

The implementation of the present invention includes the treatment to form the device structure on the substrate of the SOI wafer. The following description for the present invention is an overview of the manufacturing process, the actual configuration and the method adopted do not have to fully comply with the described content. One skilled in the art may make various modifications and changes according to the spirit and scope of the present invention, who must understand that the instructions below as examples are not to limit the present invention.

Figure 3A:
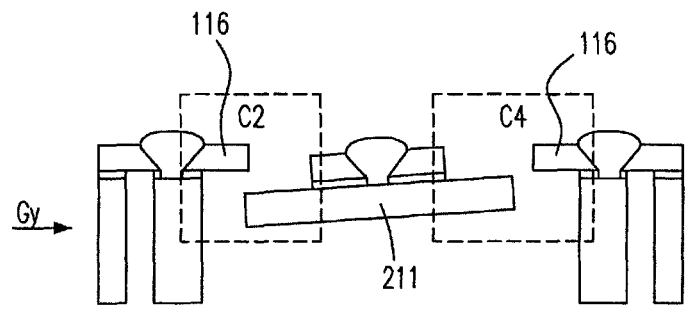
FIG. 3(a) is a BB' cross sectional view according to FIG. 1, wherein a typical accelerometer of the present invention bears a G force in the Y-axis direction.
Figure 3B:
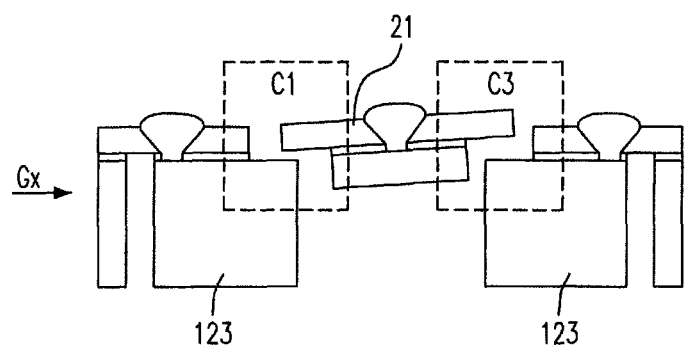
FIG. 3(b) is an AA' cross sectional view according to FIG. 1, wherein a typical accelerometer of the present invention bears a G force in the X-axis direction.

Please refer to FIG. 3 (*a*), which is a sectional view for the cross-section BB' according to FIG. 1, wherein a typical accelerometer of the present invention bears a G force in the Y-axis direction. The capacitance of the capacitors C2 and C4 can be measured by both the lower movable electrode plate 211 and two fixed electrode plates 116.

Please refer to FIG. 3 (*b*), which is a sectional view for the cross-section AA' according to FIG. 1, wherein a typical accelerometer of the present invention bears a G force in the X-axis direction. The capacitance of the capacitors C1 and C3 can be measured by both the upper movable electrode plate 21 and two fixed electrode plates 123.

Accordingly, the capacitance change on the X-axis is Cx=C1−C3, the capacitance change on the Y-axis is Cy=C2−C4. At this time, the capacitance change on the Z-axis is Cz=(C1+C3)−(C2+C4).

Figure 4:
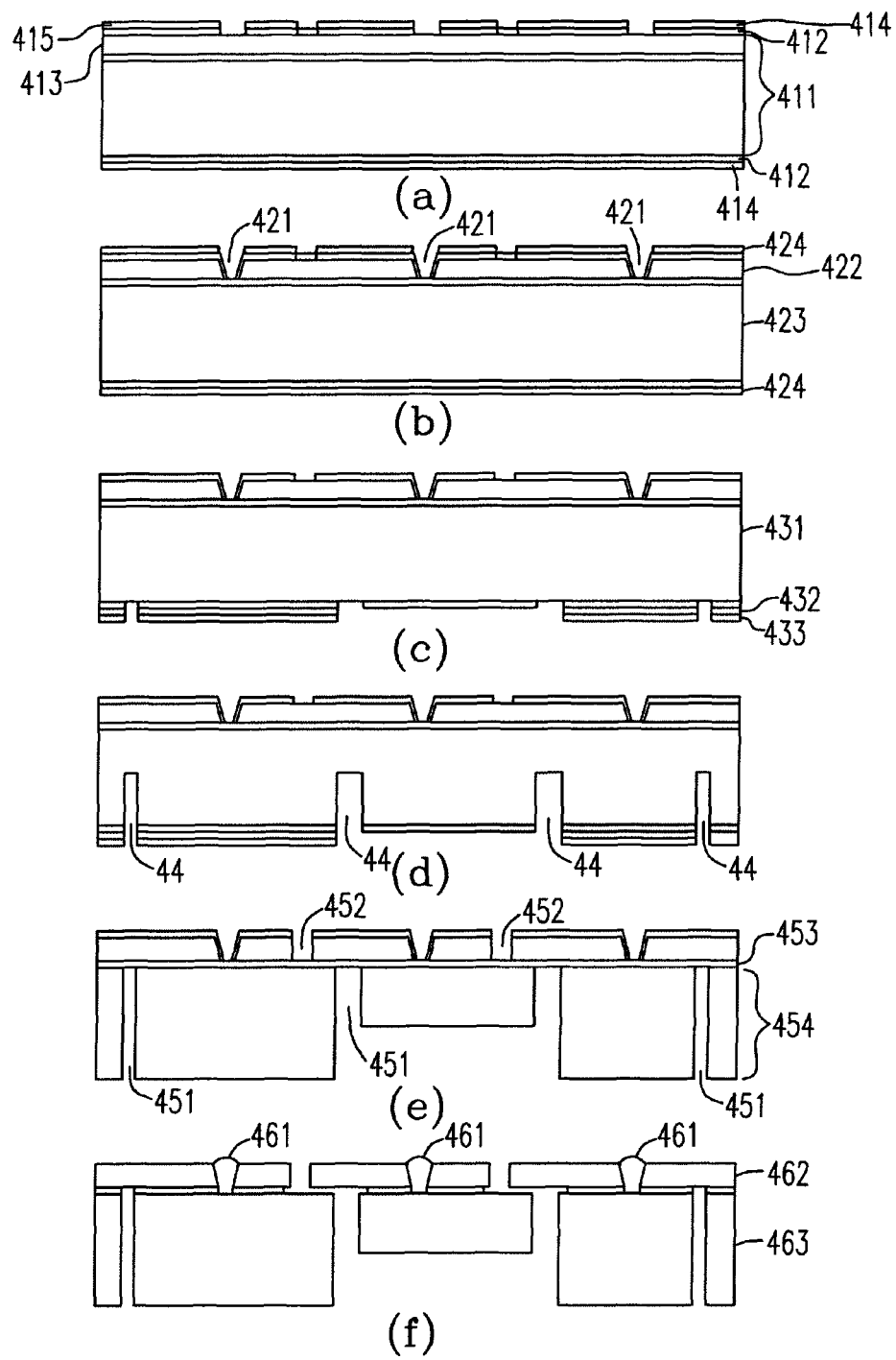

Please refer to FIG. 4(*a*)~(*f*), which are the profile diagrams showing the present fabrication process on a typical SOI wafer, wherein FIG. 4(*a*) shows the profile diagram of the oxide pattern, nitride deposition and pattern. As shown in FIG. 4(*a*), the processes began with the deposition of 1 m thick thermal oxide layers 412 on the SOI wafer 411, and then the first photo mask was used to pattern the in-plane shape of accelerometer on device silicon layer 413. After that, the 100 nm SixNy film 414 was deposited using the LPCVD (low pressure chemical vapor deposition) and then patterned by the second photo mask. The LPCVD-SixNy film 414 was used to define the metal connection window during the following bulk silicon etching.

Please refer to FIG. 4(*b*), which shows the profile diagram of the anisotropic silicon etching and oxide deposition. As shown in FIG. 4(*b*), the SOI wafer was immersed into KOH solution for anisotropic silicon etching. This bulk micromachined cavity 421 acted as the via hole between the device silicon layer 422 and the handling silicon layer 423. In addition, a 1 m thermal oxide was grown to protect the surface of the bulk micromachined cavity 421. After that, both of the front-side and backside LPCVD-SixNy films 424 were removed by RIE (reactive ion etching).

Please refer to FIG. 4(*c*), which shows the profile diagram of the oxide and PR pattern on the handling silicon layer. As shown in FIG. 4(*c*), the third mask was used to pattern the oxide layer 432 on the handling silicon layer (back-side of the SOI wafer) to define the dimension of the proof-mass and sensing electrode. Moreover, a photoresist layer 433 was deposited on the back-side of the SOI wafer and then patterned by the fourth mask. Thus, the surface of handling layer at the back-side of the SOI wafer was covered with pattered thermal oxide layers 432 and photoresist layer 433.

Please refer to FIG. 4(*d*), which shows the profile diagram of the DRIE etching. As shown in FIG. 4(*d*), the first DRIE (deep reactive ion etching) etching was used to define the thickness 44 of proof-mass and lower movable electrode. The substrate was then immersed into BOE solution to remove the oxide layer which was not protected by the photoresist.

Please refer to FIG. 4(*e*), which shows the profile diagram of removing oxide layer and DRIE etching. As shown in FIG. 4(*e*), the second DRIE was used to etch through the handling silicon layer to form the micromachined cavity 451. The DRIE etching was stopped as the buried oxide layer 453 first exposed. Thus, the thickness of the handling silicon layer 454 remained on SOI wafer acted as the proof-mass and lower sensing electrode. In addition, a front-side DRIE was employed to define the in-plane shape of accelerometer to etch through the device silicon layer to form the micromachined cavity 452, including the proof-mass, upper sensing electrode, and springs, on the device layer.

FIG. 4(*f*) shows the profile diagram of the HF release and Silver paste dispense. As shown in FIG. 4(*f*), the etching mask and sacrificial layers were then removed using HF solution, and the accelerometer was released from the substrate. Finally, the silver paste was dispensed in the bulk micromachined cavity 461 (via hole) for the electrical interconnection between the device silicon layers 462 and handling silicon layers 463. In another embodiment, the via-holes can be filled by another treatment, for example, a polycrystalline silicon deposition or a metal sputtering.

To sum up, the present invention overcomes the limitations and the disadvantage of the conventional techniques and has successfully verified the feasibility of the differential capacitive sensing electrodes with gap closing design on SOI wafer. The sensing gap thickness is precisely defined by the buried oxide layer. The metal vias are used as the electrical interconnect for lower electrode (on handling silicon layer), and to remove the parasitic capacitance as well. Moreover, the sensing electrodes also act as the limit stop for overload protection of the accelerometer. Therefore, the present invention not only solves the drawbacks but also reaches high sensing sensitivity.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A sensing accelerometer, comprising:
a substrate further comprising:
at least four fixed electrode plates; and
a movable unit further comprising:
a movable electrode having at least four edges; and
plural components connected to the substrate and the movable element,
wherein the plural components are flexible components, the substrate is a fixing substrate and comprises plural fixed anchors respectively connected to the plural flexible components, the at least four fixed electrode plates are disposed beside the at least four edges of the movable electrode so as to sense an X-axis, a Y-axis and a Z-axis accelerations, each of the at least four plural fixed electrode plates and the movable electrode has a via disposed therein, and the at least four plural fixed electrode plates comprises:
plural lower electrode plates respectively placed along a first group of the plural edges of the movable electrode, and providing a lower limit of the movable unit in the Z-axis movement, wherein the first group of the plural edges has an even total number, and includes plural pairs of associated opposite edges; and
plural upper electrode plates respectively placed along a second group of the plural edges of the movable electrode, and providing an upper limit in the Z-axis movement for the movable unit, wherein the second group of the plural edges has an even total number, and includes plural pairs of associated opposite edges,
wherein each of the plural lower electrode plates has a portion being held under the movable electrode, and each of the plural upper electrode plates has a portion being held over the movable electrode.

2. The accelerometer according to claim 1, wherein the substrate has plural inner edges each of which has an opposite one of the plural inner edges.

3. The accelerometer according to claim 1, wherein each of the plural fixed anchors has a corner, and the plural flexible components connect the respective corners of the plural fixed anchors.

4. The accelerometer according to claim 1, wherein each of the plural fixed anchors has an via disposed therein.

5. The accelerometer according to claim 4, wherein the substrate and the movable unit are made of a Silicon on Insulator (SOI) wafer, and the respective vias conduct the substrate and the movable unit.

6. The accelerometer according to claim 4, wherein the respective vias are formed by one selected from a group consisting of a silver paste, a polycrystalline silicon deposition and a metal sputtering.

7. The accelerometer according to claim 1, wherein the movable unit and each of the fixed electrode plates have a gap therebewteen, and the movable electrode and the at least four fixed electrode plates form at least four pairs of differential type capacitive sensing electrodes.

8. The accelerometer according to claim 1, wherein each of the plural components is a spring.

9. The accelerometer according to claim 1 being a capacitive sensing accelerometer with at least four pairs of gap-closing differential electrodes formed by the movable electrode and the at least four fixed electrode plates.

10. A multi-axes accelerometer, comprising:
plural fixing elements;
a movable electrode having plural edges with a first and a second groups, and having plural components respectively connected to the plural fixing elements; and
plural stationary electrode plates configured beside the movable electrode, and classified as:
plural lower electrode plates respectively placed along the first group of the plural edges of the movable electrode, and providing a lower restriction of the movable unit in a Z-axis movement; and
plural upper electrode plates respectively placed along the second group of the plural edges of the movable electrode, and providing an upper limit of the restriction movable unit in the Z-axis movement,
wherein each of the plural lower electrode plates has a portion being held under the movable electrode, each of the plural upper electrode plates has a portion being held over the movable electrode, each of the plural stationary electrode plates and the movable electrode has a via disposed therein, and the multi-axes accelerometer is a capacitive sensing accelerometer with at least four pairs of gap-closing differential electrodes formed by the movable electrode and the plural stationary electrode plates so as to sense an X-axis, a Y-axis and a Z-axis accelerations, and
wherein the plural fixing elements are plural fixing anchors.

11. The accelerometer according to claim 10, wherein each of the plural fixing anchors, each of the plural stationary electrode plates and the movable electrode are made of a Silicon On Insulator (SOI) wafer, each of the plural fixing anchors has a via configured therein, and the respective vias conduct the plural fixing anchors, the plural stationary electrode plates and the movable electrode.

12. A multi-axes accelerometer, comprising:
a movable electrode having plural edges with a first and a second groups; and
plural stationary electrode plates classified into plural lower stationary electrode plates and plural upper stationary electrode plates,
wherein the plural lower stationary electrode plates are respectively configured along the first group of the plural edges and provide a lower limit of the moving limit, the plural upper stationary electrode plates are respectively configured along the second group of the plural edges and provide an upper limit of the moving limit, the movable electrode and each of the plural stationary electrode plates have a gap therebetween, the plural stationary electrode plates are respectively configured to form at least four pairs of electrodes with the movable electrode so as to sense at least an X-axis, a Y-axis and a Z-axis accelerations, and each of the plural stationary electrode plates and the movable electrode has a via disposed therein.

13. The accelerometer according to claim 12 further comprising a fixing substrate having plural anchors and the plural stationary electrode plates, wherein the movable electrode has plural flexible components respectively connected to the plural anchors.

14. The accelerometer according to claim 12, wherein the plural stationary electrode plates are differential type capacitive sensing electrodes.

* * * * *